UNITED STATES PATENT OFFICE.

JAMES B. McCARTNEY, OF MUSCATINE, IOWA, ASSIGNOR OF ONE-FOURTH TO EVERT F. RICHMAN AND ONE-FOURTH TO CHARLES J. RICHMAN, BOTH OF MUSCATINE, IOWA.

PAINT COMPOSITION.

1,421,970.  Specification of Letters Patent.  Patented July 4, 1922.

No Drawing.  Application filed November 29, 1920. Serial No. 427,180.

*To all whom it may concern:*

Be it known that I, JAMES B. McCARTNEY, a citizen of the United States, residing at Muscatine, in the county of Muscatine and State of Iowa, have invented certain new and useful Improvements in Paint Compositions; and I do declare the following to be a full, clear, and exact description of the invention, such as will enable others skilled in the art to which it appertains to make and use the same.

This invention relates to liquid coating compositions, and the principal object of the invention is to provide a liquid coating composition which is especially adapted for application to paper, felt, iron, wood, cement, bricks, or other building materials, to exclude moisture and preserve the same against deterioration from weather conditions.

The improved composition consists of gasoline, carbon bi-sulphide, paraffin oil, refined coal tar and comminuted shells, which may well be the by-product or waste obtained in the manufacture of buttons out of fresh water clam shells, shells of mussels, and the like.

In preparing the composition, it is preferable to use the ingredients in the following proportions—viz, eight ounces of gasoline, one ounce of carbon bi-sulphide, one ounce of paraffin oil, enough coal tar to make one gallon of the mixture, and comminuted shells to suit or to give to the mixture the consistency desired.

In the preparation of the composition the gasoline, carbon bi-sulphide and paraffin oil are first thoroughly mixed together, and this mixture is thoroughly mixed with the refined coal tar, and finally the comminuted shells are added. The exact amount of the comminuted shell product is selected so as to give to the mixture the proper body according to the particular use to which it is to be applied.

Variation in the amount of the carbon bi-sulphide is sometimes desirable, as for instance, when the composition is to be applied when the temperature is below 50° F. it is preferable to use a little more than the above specified amount of this substance.

Coal tar is an important ingredient of the composition, but since that substance behaves very peculiarly under different weather conditions and at different temperatures, it has to be stabilized. The gasoline and the carbon bisulphide are used for this purpose, and very satisfactory results from using these substances have been obtained.

In using the composition, it may be applied to the surface to be coated by means of a brush, but it may also be applied by dipping or spraying.

The composition may be used to advantage for coating paper, felt, iron, wood, cement, brick and other building or other materials, as it serves to effectively exclude moisture and preserve the materials coated therewith against deterioration. Since the composition will prevent access of moist air to a surface coated thereby, rusting of the surface will be prevented if the surface is made from a substance likely to rust.

Although the specified proportions of the ingredients are believed to be best suited for the purposes described, yet good results may be obtained by slightly varying these proportions, and it is to be understood that such may be done within the scope of the appended claims.

What is claimed is:

1. A weather wearing and moisture excluding paint composition consisting of carbon bi-sulphide, coal tar, comminuted shells, and liquid thinning substance.

2. A coating composition consisting of gasoline, carbon bi-sulphide, paraffin oil, coal tar, and comminuted shells.

3. A coating composition consisting of eight ounces of gasoline, one ounce of carbon bi-sulphide, one ounce of paraffin oil, enough coal tar to make with the foregoing ingredients one gallon of mixture, and enough comminuted shells to give to the mixture the desired consistency.

In tesimony whereof I have hereunto set my hand.

JAMES B. McCARTNEY.